(12) United States Patent
Urquhart et al.

(10) Patent No.: US 8,879,509 B2
(45) Date of Patent: *Nov. 4, 2014

(54) ANTENNA DIVERSITY

(75) Inventors: Andrew Urquhart, Bishops Stortford (GB); Simon Gale, Bishops Stortford (GB)

(73) Assignee: Apple Inc., Cupertino, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 13/220,060

(22) Filed: Aug. 29, 2011

(65) Prior Publication Data

US 2011/0317625 A1 Dec. 29, 2011

Related U.S. Application Data

(63) Continuation of application No. 10/683,407, filed on Oct. 10, 2003, now Pat. No. 8,027,315.

(60) Provisional application No. 60/447,644, filed on Feb. 14, 2003.

(51) Int. Cl.
| | |
|---|---|
| H04W 4/00 | (2009.01) |
| H03C 7/02 | (2006.01) |
| H04B 1/06 | (2006.01) |
| H04W 16/10 | (2009.01) |
| H04W 40/02 | (2009.01) |
| H04W 16/28 | (2009.01) |

(52) U.S. Cl.
CPC .............. *H04W 16/10* (2013.01); *H04W 40/02* (2013.01); *H04W 16/28* (2013.01)
USPC ......... 370/334; 370/498; 455/101; 455/277.2

(58) Field of Classification Search
CPC .. H04B 7/0617; H04B 7/0669; H04B 7/0802; H04B 7/10; H04B 7/0689; H04B 7/0413; H04W 16/28

USPC .......... 370/328, 334, 498, 912, 913; 455/67.11, 67.14, 101, 103, 226.1, 455/226.2, 269, 272, 277.1, 277.2

See application file for complete search history.

(56) References Cited

U.S. PATENT DOCUMENTS 3,453,622 A * 7/1969 McKesson .................... 342/361
5,280,631 A * 1/1994 Nakahi et al. ................ 455/269

(Continued)

FOREIGN PATENT DOCUMENTS

| EP | 0 624 007 A2 | 11/1994 |
| WO | WO-00/11903 A1 | 3/2000 |

OTHER PUBLICATIONS

Hottinen, Ari; Wichman, Risto; "Transmit Diversity by Antenna Selection in CDMA Downlink;" Proc. of the IEEE 5th International Symposium on Spread Spectrum Techniques and Applications, vol. 3, Sep. 4, 1998; pp. 767-770.

(Continued)

*Primary Examiner* — Quochien B Vuong
(74) *Attorney, Agent, or Firm* — Fay Kaplun & Marcin, LLP

(57) ABSTRACT

The invention is directed to a method of communicating between a first node including a plurality of antennas and a second node, the method comprising the steps of: transmitting a signal from the first node to said second node using each of the plurality of antennas of the first node; at the second node, selecting one of the plurality of antennas for use; and communicating between the two nodes using this selected antenna. The invention is also directed to apparatus and software for performing the methods.

24 Claims, 9 Drawing Sheets

(56) References Cited

U.S. PATENT DOCUMENTS

| | | | |
|---|---|---|---|
| 5,933,421 A | 8/1999 | Alamouti | |
| 5,966,102 A * | 10/1999 | Runyon | 343/820 |
| 6,243,565 B1 * | 6/2001 | Smith et al. | 455/101 |
| 6,377,612 B1 | 4/2002 | Baker | |
| 6,411,824 B1 | 6/2002 | Eidson | |
| 6,539,209 B1 | 3/2003 | Dajer et al. | |
| 6,751,187 B2 | 6/2004 | Walton | |
| 6,754,286 B2 | 6/2004 | Hottinen | |
| 6,788,658 B1 | 9/2004 | Bims | |
| 6,862,440 B2 | 3/2005 | Sampath | |
| 6,865,377 B1 | 3/2005 | Lindskog | |
| 6,917,820 B2 | 7/2005 | Gore | |
| 6,963,619 B1 | 11/2005 | Gesbert et al. | |
| 6,987,952 B2 | 1/2006 | Raghothaman | |
| 7,046,650 B2 * | 5/2006 | Sherman | 370/338 |
| 7,058,363 B2 | 6/2006 | Hottinen | |
| 7,075,906 B2 | 7/2006 | Douglas | |
| 7,136,627 B2 | 11/2006 | Hamalainen | |
| 7,171,223 B2 | 1/2007 | Herscovich et al. | |
| 7,453,832 B2 * | 11/2008 | Steer et al. | 370/278 |
| 2002/0164963 A1 | 11/2002 | Tehrani et al. | |

OTHER PUBLICATIONS

Rajan, Dinesh; Gray, Steven D.; "Transmit Diversity Schemes for CDMA-2000;" Proceedings of the Wireless Communications and Networking Conference (WCNC), vol. 2, New Orleans, Lousiana, Sep. 21-24 1999; pp. 669-673.

* cited by examiner

ANTENNA DIVERSITY

RELATED APPLICATION

This application is a continuation of U.S. patent application Ser. No. 10/683,407, filed Oct. 10, 2003, which is the full utility filing of U.S. provisional application No. 60/447,644 filed on Feb. 14, 2003, from which the present application claims priority and which is incorporated herein be reference.

CROSS-REFERENCE TO RELATED APPLICATIONS

This patent application is related to the following Provisional patent applications filed in the U.S. Patent and Trademark Office, the disclosures of which are expressly incorporated herein by reference:

U.S. Patent Application Ser. No. 60/446,617 filed on Feb. 11, 2003 and entitled "System for Coordination of Multi Beam Transit Radio Links for a Distributed Wireless Access System" [15741]

U.S. Patent Application Ser. No. 60/446,618 filed on Feb. 11, 2003 and entitled "Rendezvous Coordination of Beamed Transit Radio Links for a Distributed Multi-Hop Wireless Access System" [15743]

U.S. Patent Application Ser. No. 60/446,619 filed on Feb. 12, 2003 and entitled "Distributed Multi-Beam Wireless System Capable of Node Discovery, Rediscovery and Interference Mitigation" [15742]

U.S. Patent Application Ser. No. 60/447,527 filed on Feb. 14, 2003 and entitled "Cylindrical Multibeam Planar Antenna Structure and Method of Fabrication" [15907]

U.S. Patent Application Ser. No. 60/447,643 filed on Feb. 14, 2003 and entitled "An Omni-Directional Antenna" [15908]

U.S. Patent Application Ser. No. 60/447,645 filed on Feb. 14, 2003 and entitled "Wireless Antennas, Networks, Methods, Software, and Services" [15912]

U.S. Patent Application Ser. No. 60/447,646 filed on Feb. 14, 2003 and entitled "Wireless Communication" [15897]

U.S. Patent Application Ser. No. 60/451,897 filed on Mar. 4, 2003 and entitled "Offsetting Patch Antennas on an Omni-Directional Multi-Facetted Array to allow Space for an Interconnection Board" [15958]

U.S. Patent Application Ser. No. 60/453,011 filed on Mar. 7, 2003 and entitled "Method to Enhance Link Range in a Distributed Multi-hop Wireless Network using Self-Configurable Antenna" [15946]

U.S. Patent Application Ser. No. 60/453,840 filed on Mar. 11, 2003 and entitled "Operation and Control of a High Gain Phased Array Antenna in a Distributed Wireless Network" [15950]

U.S. Patent Application Ser. No. 60/454,715 filed on Mar. 15, 2003 and entitled "Directive Antenna System in a Distributed Wireless Network"

U.S. Patent Application Ser. No. 60/461,344 filed on Apr. 9, 2003 and entitled "Method of Assessing Indoor-Outdoor Location of Wireless Access Node" [15953]

U.S. Patent Application Ser. No. 60/461,579 filed on Apr. 9, 2003 and entitled "Minimisation of Radio Resource Usage in Multi-Hop Networks with Multiple Routings" [15930]

U.S. Patent Application Ser. No. 60/464,844 filed on Apr. 23, 2003 and entitled "Improving IP QoS though Host-Based Constrained Routing in is Mobile Environments" [15807]

U.S. Patent Application Ser. No. 60/467,432 filed on May 2, 2003 and entitled "A Method for Path Discovery and Selection in Ad Hoc Wireless Networks" [15951]

U.S. Patent Application Ser. No. 60/468,456 filed on May 7, 2003 and entitled "A Method for the Self-Selection of Radio Frequency Channels to Reduce Co-Channel and Adjacent Channel Interference in a Wireless Distributed Network" [16101]

U.S. Patent Application Ser. No. 60/480,599 filed on Jun. 20, 2003 and entitled "Channel Selection" [16146]

FIELD OF THE INVENTION

This invention relates to methods and apparatus for wireless communication using antenna diversity.

BACKGROUND TO THE INVENTION

Radio communication between two terminals is subject to 'fading' conditions caused by the constructive addition or cancellation of multiple arriving signals. These signals might be comprised of a direct signal from transmitter to receiver, plus various other signals that arrive at slightly later time (and from different angles), having been reflected from other objects in the path between the two terminals. Dependent on the exact position of the transmitter and receiver terminal, these multiple arrivals will arrive either in-phase (giving constructive addition) or out of phase (giving signal cancellation). This variation in the received signal power is referred to as fading. The extent to which the local environment varies (e.g. due to leaves on trees moving, vehicular movement) determines whether the fade conditions remain constant for a particular placement of the terminals or vary with time.

Typically, a radio link will be deployed with sufficient margin in the received signal strength such that fades due to signal cancellation can be tolerated, while still maintaining sufficient signal power for the transmitted data to be decoded. This allowance has a significant impact on the range that can be achieved with the radio link, for a given transmitted power output level. It is therefore highly desirable to identify techniques which allow this fading margin to be minimised.

One such technique is the use of receive diversity. The receiving terminal is equipped with two antennas which may be positioned, for example, with a spatial separation that is sufficient for the fading conditions at each antenna to be considered statistically independent. In a switched diversity mode of operation, the receiver then selects the antenna with the best signal. If, for example, there is a 1% probability of fades greater than 20 dB below the mean signal power (averaged over local fading), there is then only a 0.01% chance that both antennas will have above a 20 dB fade. For a constant outage probability, the fade margin can therefore be reduced.

FIG. 1 shows a transmitter 101 having two antennas 102, 103 and a receiver 104 having two antennas 105, 106. There are 4 possible propagation paths 108-111 between the transmitter and the receiver antenna pairs. If the transmitter 101 transmits using one of its antennas 102, the receiving terminal (or receiver) can select the better of the two propagation paths 109, 110 to the two receiver antennas, which considerably reduces the fade margin required. This provides a 2-way switched diversity function.

In a time domain duplex (TDD) mode of transmission, the same frequency band is used for the reverse link (terminal B to terminal A) as for the forward link (terminal A to terminal B). For a communication that begins with a link from terminal A to terminal B, it is possible for terminal B to benefit from 2-way diversity. Provided that the propagation conditions have remained constant while the transmission switches direction, terminal B can then re-transmit back to terminal A using the same antenna that was found to be best when it was in receiving mode. Terminal A then makes a second antenna selection of its two antennas for signal reception. When terminal A transmits again back to terminal B, it can again select the best antenna from reception for use as the transmitting antenna. This can continue indefinitely, iterating towards the best possible selection of all four propagation paths, and adapting to changes in the propagation conditions. This process is referred to herein as the "iterative process".

However, it can be shown that the gain available (i.e. reduction in fade margin) using the iterative process is in many circumstances less than the potential diversity gain if the best of all possible paths were selected.

OBJECT TO THE INVENTION

The invention seeks to provide a method for wireless communication using antenna diversity which mitigates at least one of the problems of known methods.

SUMMARY OF THE INVENTION

According to a first aspect of the invention there is provided a method of communicating between a first node including a plurality of antennas and a second node, said method comprising the steps of: transmitting a signal from said first node to said second node using each of the plurality of antennas of said first node; at the second node, selecting one of said plurality of antennas for use; and communicating between the two nodes using said selected antenna.

The method may further comprise the step of: communicating from said second node to said first node an indication of said selected antenna.

The plurality of antennas may be spatially separated.

The plurality of antennas may use polarisation diversity.

The selecting step may comprise the step of: measuring the received strength of said signal; and making said selection based on said measurement.

The transmitting step may comprise the step of: sequentially transmitting a data packet from each of said plurality of antennas.

Each said data packet may comprise an indication of which said antenna transmitted said packet.

The data packet may be a Request to Send frame modified to include said indication.

The step of communicating may comprise sending a modified Clear to Send frame including said indication.

The data packet may be a test frame.

The signal may comprise a data packet, said data packet comprising a plurality of sub-packets, and wherein said transmitting step may comprise: sequentially transmitting a sub-packet from each of said plurality of antennas.

The data frame may be configured according to a higher layer protocol.

The indication of said selected antenna may be configured according to a higher layer protocol.

The step of sequentially transmitting a data packet from each of said plurality of antennas, may further comprise: transmitting said data packets at a defined time interval.

The step of sequentially transmitting a data packet from each of said plurality of antennas, may further comprise: transmitting said data packets in a sequence known to said second node.

According to a second aspect of the invention there is provided a method of optimising communication between a node including a plurality of antennas and a remote node, said method comprising the steps of: transmitting a communication from said node to said remote node using each of the plurality of antennas of said node; receiving a communication from said remote node indicating a selection of one of said plurality of antennas; and communicating with said remote node using said selected antenna.

According to a third aspect of the invention there is provided a method of optimising communication between a node and a remote node including a plurality of antennas, said method comprising the steps of: receiving a communication from said remote node using each of said plurality of antennas; selecting one of said plurality of antennas for use; and communicating said selection to said remote node.

According to a fourth aspect of the invention there is provided a node in a wireless communications network comprising: an antenna for receiving signals from each of a plurality of antennas at a remote node; a processor for determining the optimum signal of said signals from said remote node according to predetermined criteria; and a transmitter for communicating said determination to said remote node.

According to a fifth aspect of the invention there is provided a node in a wireless communications network comprising: a transceiver and a processor, wherein a signal is received from each of a plurality of antennas at a remote node at the transceiver, said signal is processed to select an optimum one of said plurality of antennas according to predetermined criteria in the processor and a selection is output to said remote node by the transceiver.

According to a sixth aspect of the invention there is provided a wireless network comprising a plurality of nodes as described above.

According to a seventh aspect of the invention there is provided a protocol extending a function of the 802.11 Request to Send and Clear to Send frames, such that these frames carry data to identify an antenna used for transmission.

According to an eighth aspect of the invention there is provided a higher level protocol utilising 802.11 standard MAC layer frame definitions to test multiple transmitter to receiver propagation while remaining compatible with an 802.11 standard. According to a ninth aspect of the invention there is provided a protocol in which nodes in a network determine whether to test multiple transmitter to receiver propagation paths, based on anticipated gain and signalling overhead.

Advantageously, this allows the margin allowed for signal fading to be reduced, thereby increasing the achievable range of the radio link. This allows a significant reduction on the overall number of links required, and hence reduces the system cost.

According to a tenth aspect of the invention there is provided a protocol in which nodes in a network determine a rate at which to test multiple transmitter to receiver propagation paths, based on an anticipated rate of change of a propagation channel between any two of said nodes and signalling overhead.

The method may be performed by software in machine readable form on a storage medium.

The preferred features may be combined as appropriate, as would be apparent to a skilled person, and may be combined with any of the aspects of the invention.

BRIEF DESCRIPTION OF THE DRAWINGS

Embodiments of the invention will now be described with reference to the accompanying drawings in which.

DETAILED DESCRIPTION OF INVENTION

Figure 1:
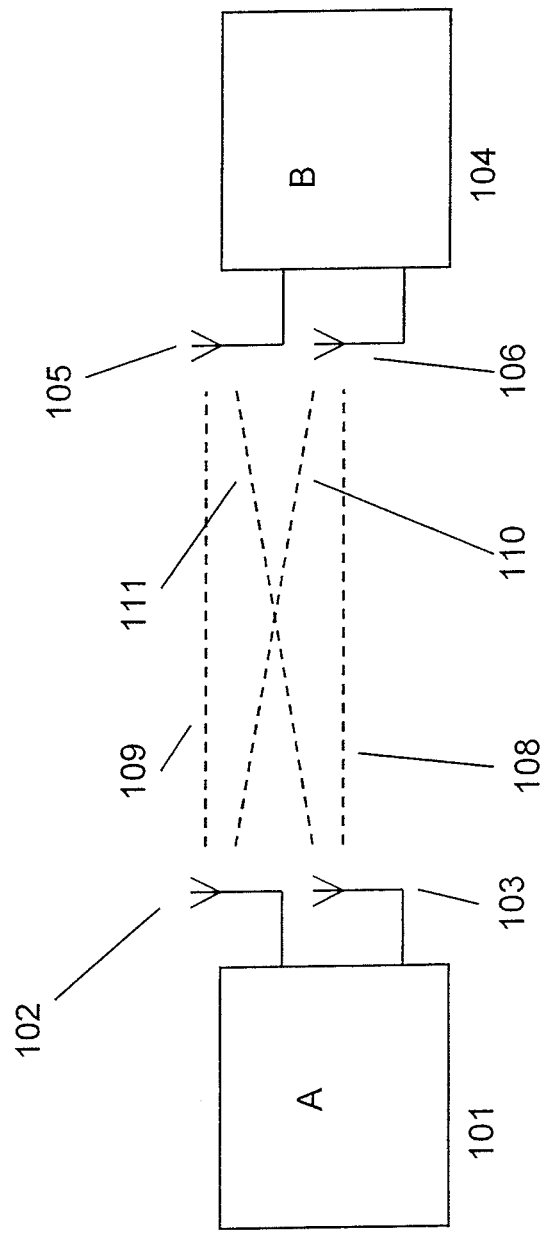
FIG. 1 is a schematic diagram of a radio link with 2 antennas at one terminal and 2 antennas at a second terminal, indicating the 4 propagation paths between the terminals.

Embodiments of the present invention are described below by way of example only. These examples represent the best ways of putting the invention into practice that are currently known to the Applicant although they are not the only ways in which this could be achieved.

As stated above, the gain available using the iterative process is in many circumstances less than the potential diversity gain if the best of all possible paths were selected. This difference between the best gain achieved and the ideal is increased further in some circumstances where the two antennas use polarisation diversity, rather than spatial separation. If the signal is transmitted on one polarisation, it must be diffracted or reflected from surfaces in order to become converted to the orthogonal polarisation. If the propagation is unobstructed, this does not occur and an antenna on the same polarisation as the transmitter will receive a greater signal than on an antenna on the orthogonal polarisation. This reduces the receive diversity gain available.

There is a further loss to the iterative process described above. If terminal A transmits on a first polarisation V and there is little polarisation conversion, terminal B will mostly find best reception on V as well. If either terminal deviates from V, it will suffer a loss of signal. However, it is possible that better fading conditions would have been available if both terminals used H, but this will not be discovered by the iterative diversity algorithm. V and H are used here are examples of two orthogonal polarisations, other pairs of orthogonal polarisations could also be used, such as +45° and −45°.

In the description below, terminals and nodes are, by way of example only, described as having two antennas, thus providing spatial diversity. It will be apparent to a person skilled in the art that the technique is equally applicable to the situation where two orthogonal polarisations, i.e. providing polarisation diversity. The technique can also be applied to the situation where both spatial and polarisation diversity are used.

Each antenna may be a single element, a column of elements (as described in a co-pending application detailed below) or any other suitable type. The antenna diversity may alternatively be provided by two polarisations of a single antenna element or column of elements.

The description below refers to terminals each having 2 antennas, thus providing 4-way diversity scheme. This technique is however applicable to a first node having M-way antenna diversity (e.g. M antennas) and a second node having N-way antenna diversity, to provide a M×N-way diversity scheme, (where M is 2 or more and N is at least one).

The description below refers to transmitting and receiving nodes (or terminals). It should be appreciated that both nodes are capable of both transmitting and receiving and this terminology is used by way of explanation only. In the description below it is the "transmitting node" which initiates the communication.

The nodes may contain separate transmitting and receiving apparatus, or may contain apparatus which is capable of both transmitting and receiving. The term 'transceiver' is referred to herein as any apparatus capable of transmitting and/or receiving.

According to this invention, there is shown a method where the two nodes (or terminals) co-operate to discover the best propagation of all the paths available to them. For the purposes of this explanation, both nodes have two antennas. This can be achieved by the transmitting node making transmissions on both antennas, following an algorithm that is known to the receiving node, so that the receiving node can then select the best of all combinations. This selection can then be communicated to the transmitting node so that data transfer can take place using the optimum antenna pair. This technique, referred to herein as the "4-way diversity scheme" is described in more detail below.

The IEEE 802.11 Wireless LAN standard may be used for communication between two nodes within a wireless network. According to this standard, communication uses time domain duplexing on a carrier frequency in the region of 2.4 GHz or 5-6 GHz. This standard is typically intended for communication between an access point and multiple mobile (or portable) terminals. Communication may begin with a request to send (RTS) frame, followed by a clear to send (CTS) frame if the request was received correctly. Once this initial exchange is complete, the two terminals can begin communication. Other terminals, also able to receive these signals, can then determine from receipt of the RTS and/or CTS frames that the frequency is in use and delay their own requests for communication. The RTS and CTS frames contain an indication of the length of the planned communication, in order that these other terminals can determine how large a delay is required before initiating their own requests. The use of RTS and CTS frames is typically invoked when the packet length exceeds a predetermined threshold, but may be used at any time deemed appropriate to optimise the system performance.

In a first embodiment of the invention, a transmitting terminal having two antennas sends two specially adapted RTS frames, each on an alternate antenna. The receiving terminal (which may have one or more antenna) allows time to receive both RTS frames then determines the best receiving antenna for each frame, using a standard 2-way diversity algorithm (e.g. as described above in relation to FIG. 1). If the receiving terminal is able to decode both frames successfully, it can select the best combination of receiving and transmitting antennas. It would then return a special CTS frame, containing information to instruct the transmitting terminal which antenna to use for future transmissions. This might be the first or the second antenna as used by the transmitting terminal. However, if one of the two transmitted RTS frames were not received correctly, the receiving terminal would not know which transmitting antenna had been used. It is therefore desirable that the transmitting terminal should embed a code (also referred to as a tag or an identifier) in the specially adapted RTS that can be returned by the receiving terminal in order to identify the best antenna for use.

This transmission of dual RTS frames (one from each antenna) does reduce the efficiency of the setup procedure for a communication link as it increases the system overhead. In a preferred embodiment, the network nodes (or terminals) retain statistics of the diversity benefits gained from 4-way diversity relative to the iterative process. If little benefit was obtained by use of 4-way diversity relative to the iterated 2-way diversity, the system may then choose to disable the 4-way diversity features and minimise the link setup time. Additionally, the system may choose to only periodically assess which antennas should be used. This has the benefit that if the radio propagation conditions are found to change slowly, the system can reduce the frequency at which the 4-way diversity selection is updated, thereby reducing the signalling overhead. Ideally, the antenna selection for 4-way diversity would be updated at a frequency compatible with the rate of change of the propagation channel. Other techniques for maximising the benefit of this technique whilst minimising the additional overhead are described below.

As described above RTS and CTS frames may not, in some systems, be used for packet lengths below a certain threshold. It may therefore be advantageous to lower the threshold either permanently or periodically, to force the use of the specially modified RTS and CTS frames. Alternative embodiments using other frame formats which avoid the use of the specially modified RTS/CTS exchange are described below.

The exchange of information between the two nodes is shown in FIGS. 3-6 and described in more detail below. Common reference numerals have been used where appropriate.

In a specific example, the network nodes may be Wireless Access and Routing Points (WARPs) arranged in a mesh network. This is by way of example only and the technique is also applicable to other types of network nodes. WARPs are described in more detail a number of co-pending U.S. patent applications including those listed below:

Nortel reference 158971D: Damian Bevan, Steve Baines and Simon Gale entitled "Wireless Communication"
Nortel reference 159071D: Martin Smith and Andrew Urquhart
Nortel reference 159081D: Martin Smith, Sonya Amos and Andrew Urquhart entitled "An Omni Directional Antenna Antenna"
NORTEL reference 159121D: Martin Smith, Chris Ward, Damian Bevan et al.

Figure 2:
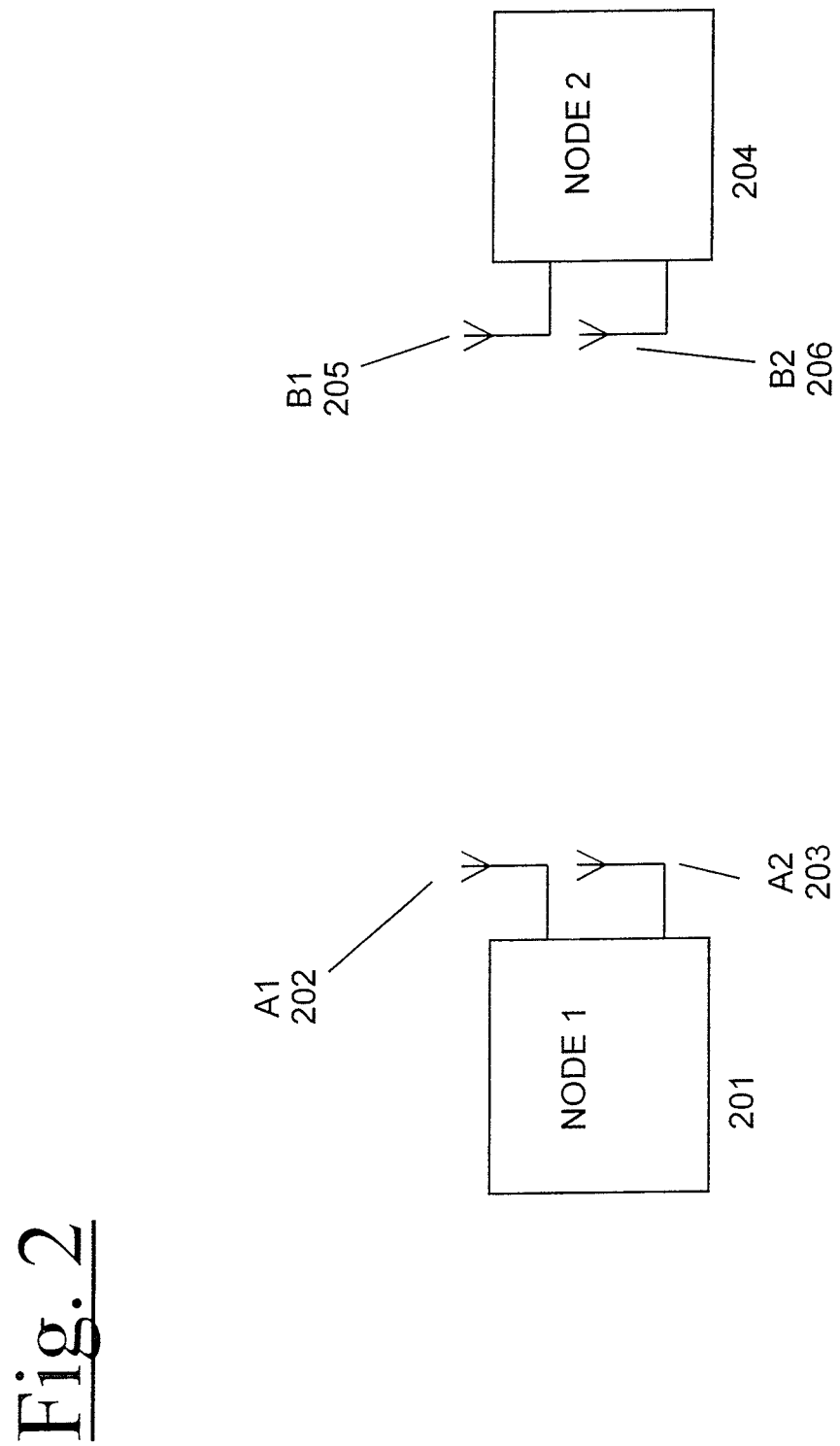
FIG. 2 is a schematic diagram showing a radio link in which two nodes communicate, each node having 2 antenna channels.

FIG. 2 shows a schematic diagram of a wireless link between a first node or terminal 201 called NODE 1 and a second node or terminal 204 called NODE 2. NODE 1 201 has two antennas 202 (A1), 203 (A2) and NODE 2 204 has two antennas 205 (B1), 206 (B2). This configuration is by way of example only and this technique is not limited to nodes with two antennas, (the technique requires at least two diverse communication paths, which may utilise spatial and/or polarisation diversity). In the examples shown, NODE 1 initiates the communication. This is by way of example only.

In the description that follows, it is assumed that the RTS or CTS frames are specially adapted so as to include tag information to denote the antenna selections or requests. In an implementation compatible with the 802.11 standard, these may be adaptations of the currently defined RTS or CTS frames, or may be other frames (for example, data frames) which a proprietary system interprets as having the antenna selection and RTS/CTS function. Alternatively, the specially adapted RTS and CTS frames may be provided by implementing a higher level protocol with the transmitted user data in an 802.11 frame structure. Systems operating according to this higher level protocol may be configured such that the frames used to implement the 4-way diversity selection also provide an RTS and CTS function.

It is also assumed that communication may be between two WARP modules, acting as the NODE 1 and NODE 2 shown in FIG. 2. These may implement a modified version of the 802.11 standard, or may use an overlaid control protocol such that they remain compatible with the 802.11 standard while also having proprietary interpretation for a higher layer protocol within the data packets.

Figure 3:
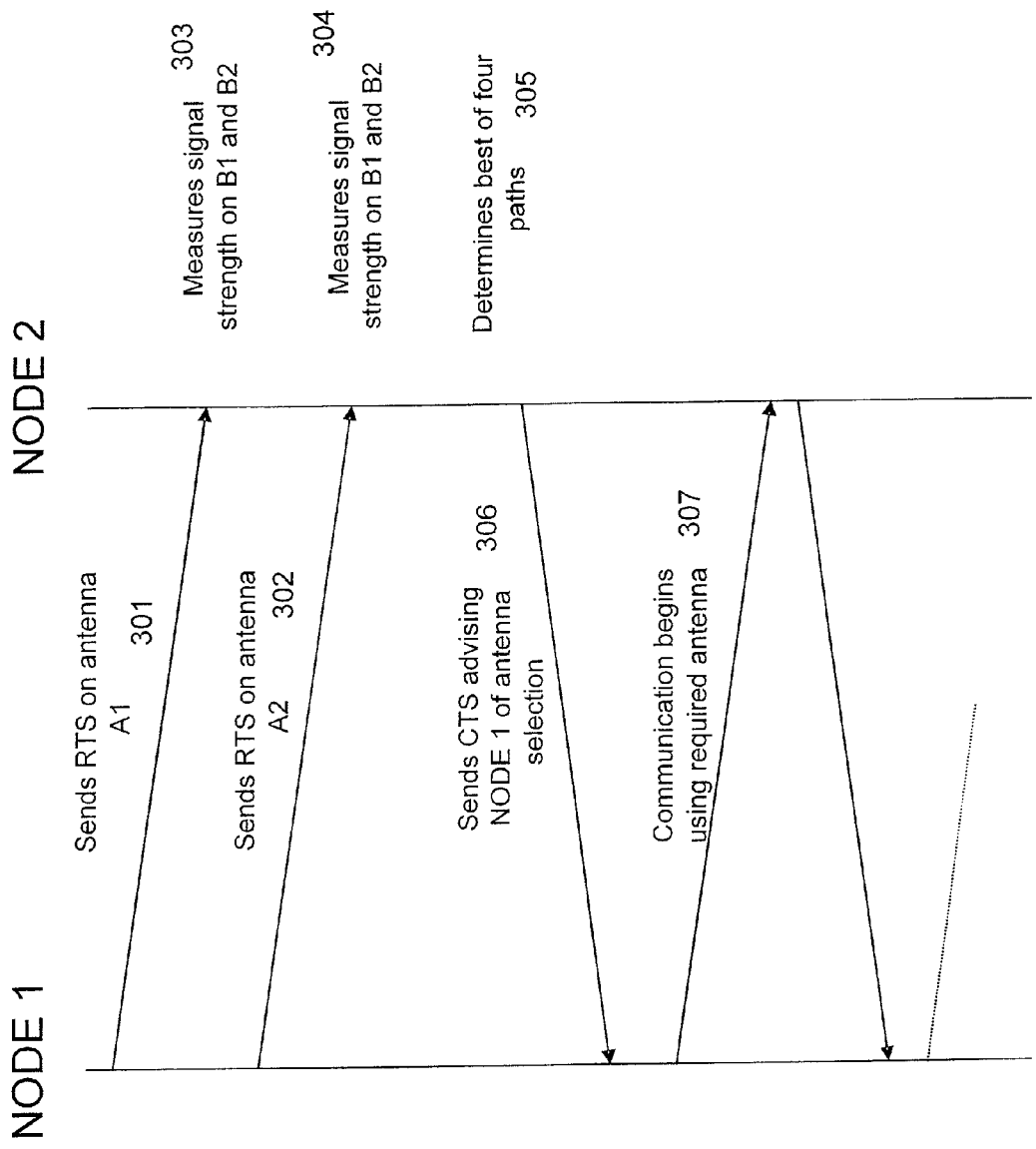
FIG. 3 is a flow diagram indicating a possible data exchange between two nodes in order to implement the proposed 4-way diversity idea.

In FIG. 3 the basic scheme for communication over a wireless link as shown in FIG. 2 is illustrated. The transmitting node, NODE 1 sends both RTS frames (steps 301 and 302) and then waits for a CTS frame in return. NODE 2 receives the two RTS frames on both antennas B1 and B2, and measures the received signal strength of each frame on each antenna (steps 303 and 304). NODE 2 then sends a CTS frame to NODE 1 advising NODE 1 of the antenna selection which has been made at NODE 2 on the basis of analysis of properties of the received signals (analysis is step 305 and sending of CTS is step 306). This analysis of the received signal may be based on received signal strength, but also on correct decoding of the transmitted frame, so as to reduce the potential impact of interference from other nodes using the same frequency channel. As described, the RTS frames include data to identify the antenna used to send the frame and the CTS frame contains an antenna selection instruction. Once the antenna selection has been established, communication continues between the two nodes using the designated antenna pair (step 307). This antenna selection can be modified by further diversity selections at the receiving node, or by the receiving node initiating a repeat trial of both transmitting node antennas A1 and A2, (i.e. initiating steps 301-307 again).

For an embodiment based on the 802.11 standard, it is assumed that the duration fields contained within RTS and CTS frames would be incremented appropriately to allow for the extended transmission time in order to employ the 4-way diversity technique described. It is also assumed that the value of the 802.11 "CTSTimeout" parameter may be set relative to the end of transmission of the second RTS frame.

The antenna tagging within RTS and CTS frames may be provided as a proprietary interpretation of the 'more data' fields or of the power management fields. Alternatively, the RTS and CTS may be implemented as a higher layer protocol definition over conventional 802.11 data frames, thereby allowing the antenna tag fields to be incorporated.

Figure 4:
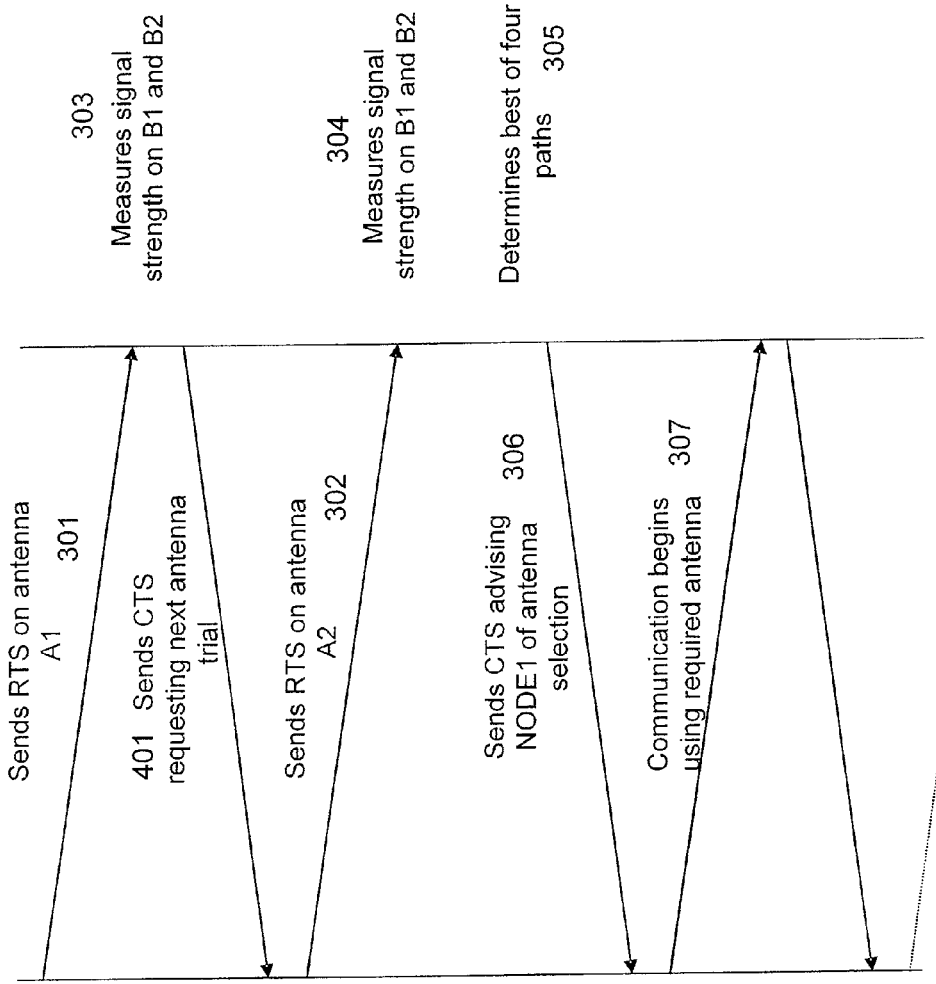
FIG. 4 is a flow diagram indicating a second possible data exchange between two nodes in order to implement the proposed 4-way diversity idea.

In FIG. 4, there is shown an alternative scheme to that shown in FIG. 3, where a separate CTS frame is sent following each RTS frame. After receiving the first RTS (step 301), NODE 2 measures the signal strength or other signal parameter (step 303) and sends a CTS acknowledging receipt of the first RTS and requesting trial of the next antenna (step 401). NODE 1 then sends the second RTS (step 302) which is again received and analysed at NODE 2 (step 304) and a determination of the best path is made (step 305) which is communicated to NODE 1 (step 306) in order that communication can start (step 307) as in FIG. 3. If the second RTS is not received at NODE 2, then NODE 2 responds to NODE 1 after allowing the appropriate RTS and inter-frame spacing to elapse.

Figure 5:
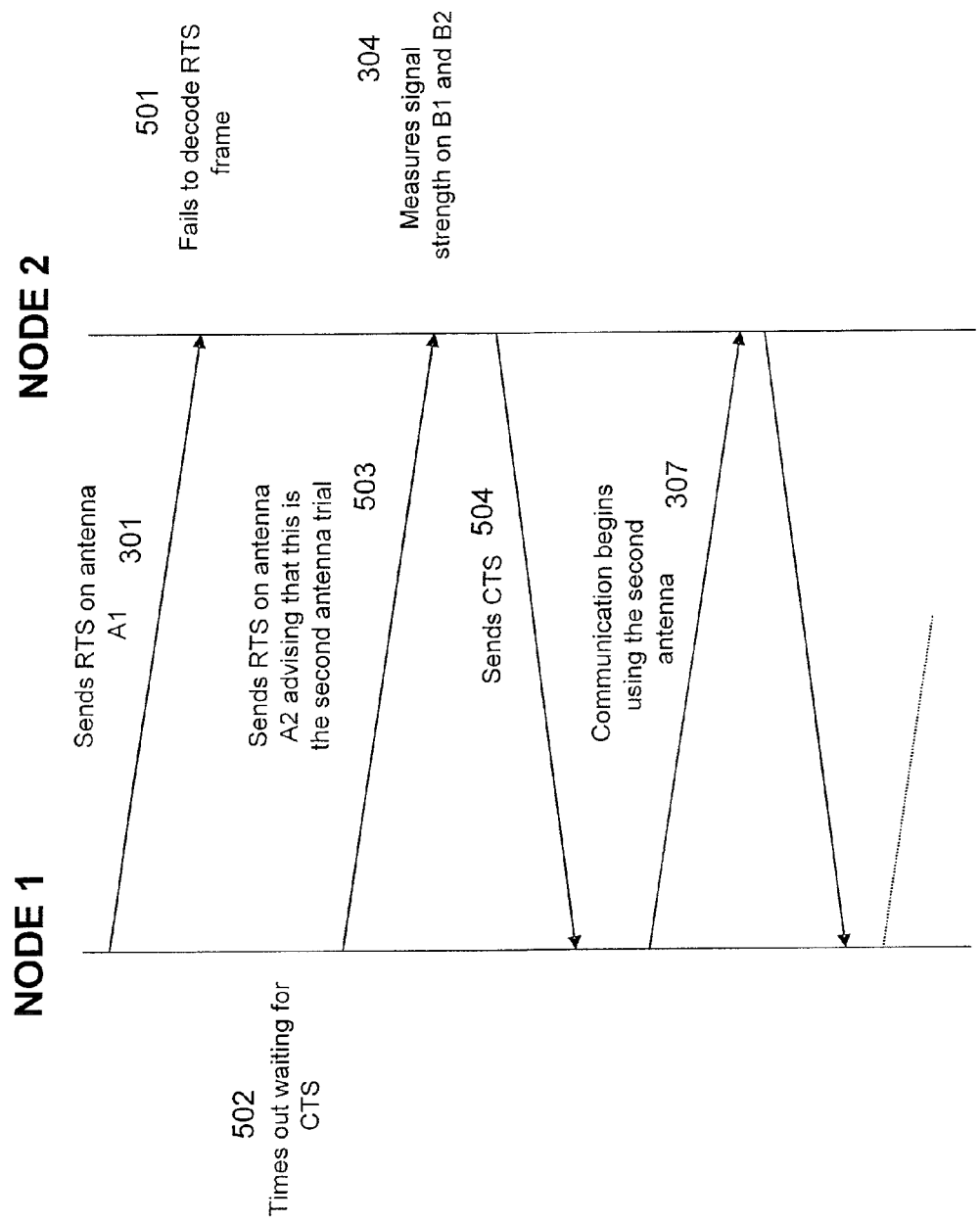
FIG. 5 is a flow diagram indicating a possible scenario based on the above data exchange in which the first transmitted data is not received successfully.

This same approach to that shown in FIG. 4 is also shown in FIG. 5. However, FIG. 5 shows the scenario where the first frame is not decoded successfully (on either antenna at the receiving node, NODE 2, step 501). NODE 1 therefore does not receive a CTS in response to the RTS (step 401 from FIG. 4 is missing). After a period of waiting, NODE 1 may time out (step 502) and then proceed to send the RTS from the other antenna A2. The RTS preferably includes an identifier advising that this RTS is the second antenna trial (step 503). NODE 2 measures the signal strength of this RTS on both antennas B1 and B2 (step 304) and sends a CTS to NODE 1 (step 504). Communication can then begin using the second antenna (step 307).

Figure 6:
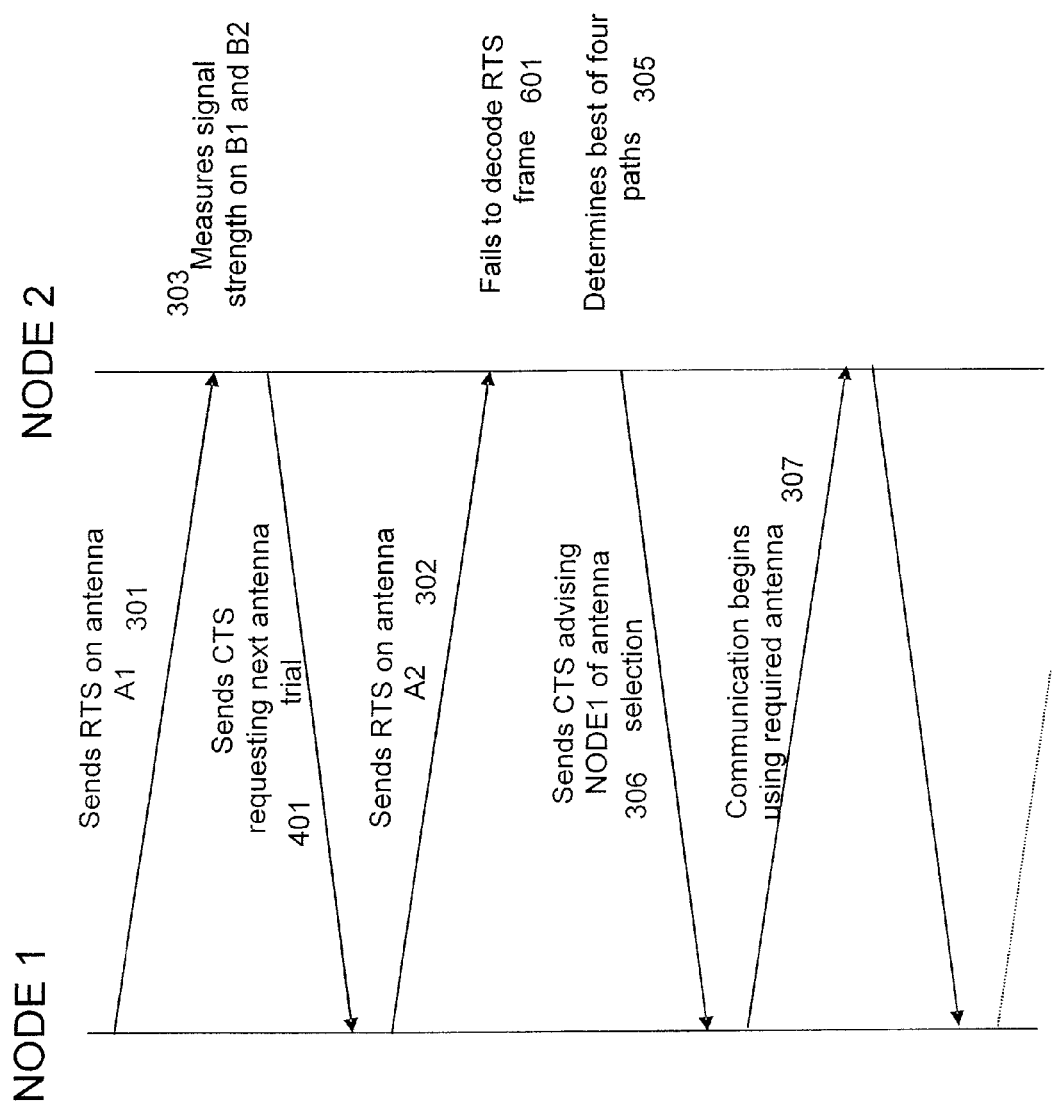
FIG. 6 is a flow diagram indicating a possible scenario based on the above data exchange in which the second transmitted data is not received successfully.

FIG. 6 shows a similar scenario, but where the second RTS frame fails to be decoded successfully (step 601). If the receiving node, NODE 2, has been informed that there are only two antennas on NODE 1, the receiving node can still make a determination of the best path (step 305), either because it knows that it has received an RTS which it cannot decode or because it times out waiting for the second RTS (not shown) and can therefore deduce that the second RTS has been sent but not received. In the scenario shown in FIG. 6, NODE 2 must send the second CTS to NODE 1 within a pre-defined time interval following the sending of the first CTS frame. The timeout at NODE 1 for the arrival of this CTS frame will also be set accordingly. This also requires that NODE 1 transmit the second RTS frame at a defined interval following the arrival of the first CTS frame, such that NODE 2 can use a time counter to determine a time by which the second RTS frame should have been received. It is also assumed that NODE 2 must be provided with information to determine the number of RTS frames to be transmitted and the order with which they will be sent. This allows NODE 2 to determine when to respond, based on the antenna selection that is decoded from any one of the RTS frames received.

In order to assist in scenarios as shown in FIGS. 5 and 6, NODE 2 may be informed of how many antennas there are at NODE 1 (i.e. how many RTS frames to expect) and/or that there are no further antennas to trial at the transmitting node, NODE 1. In the scenarios above, it may also be beneficial that the frames are transmitted at specific time intervals and/or in a specific order known to both NODE 1 and NODE 2.

Co-ordination between the transmitting and receiving nodes in order to implement this 4-way diversity selection is possible with the WARP transit links, as these involve communication between two WARP modules, each of which may include this proprietary protocol in addition to the standard 802.11 radio interface (e.g. 802.11a). The WARP also provides access link service to subscribers, for which the communication may be limited to the 802.11 protocol. The same diversity algorithm could also be applied to the access link. Timing synchronisation, transit links and access links are described in more detail in co-pending U.S. patent application having Nortel reference 158971D as detailed above.

In a second embodiment, NODE 1 may send two short test data packets to NODE 2, either with or without using the RTS/CTS mechanism. The first test packet would be sent on one antenna and the second packet on the other antenna, the contents of each packet data field would consist of a short message including an indication of which antenna was being used for the transmission of that particular packet. During the reception of these test packets the receiving node would determine the best receiving antenna to use. This determination may be achieved by comparing signal strengths from the two receive antennas during the preamble part of the transmission, as might be standard practice implied by the 802.11 standard. Alternatively, other signal metrics well known in the art could be used for the determination. During the subsequent data part of the transmission NODE 2 would then measure the received signal strength. NODE 2 could then compare the received signal strengths from the two test packets and from the decoded data field learn which antenna was used to send them, it would then send back a message to NODE1 informing it which antenna it should optimally use for subsequent packet exchanges.

The test packets referred to above, may be sub-frames (or sub-packets) of a larger frame (or packet). For example the two short test data packets may be the first and second sub-frames of a larger test packet, or the first and second sub-frames of a modified RTS frame.

In both embodiments, it may not be necessary to update the antenna selection using the described diversity scheme on every transmission. Depending on the rate of change of the communication channel (or path) conditions between the two nodes, it may be necessary to update the antenna selection frequently, or in a more stable situation these updates may be more rarely required. By monitoring the regularity upon which it is necessary to change the antenna selection, it may be beneficial to adapt the rate of the antenna selection process to match the historical or predicted rate of change of the channel.

For example, if in a system, it is determined that on average every 0.3 seconds it is necessary to change the antenna selection, then it may be beneficial to check the antenna selection at least every 0.3 seconds. However, if it proves necessary to change the antenna selection every 300 seconds, (for a more stable system such as a line of sight between two fixed nodes), then antenna selection need be checked considerably less frequently, thereby reducing the system overhead of the described diversity scheme. The system can therefore be designed to adapt to the detected channel conditions.

Use of the described 4-way diversity scheme (or more generally a M×N-way diversity scheme) is beneficial because any reduction in fade margin can allow radio links to operate over an increased range.

The WARP modules are intended to be installed as a mesh network architecture in which data is transferred across between multiple terminals, using a multi-hop or relay structure. Any increase in the range supported by each radio link allows a reduction in the total number of WARPs needed to cover a given area. This reduces the network cost to the operator of the WARP network.

Figure 7:
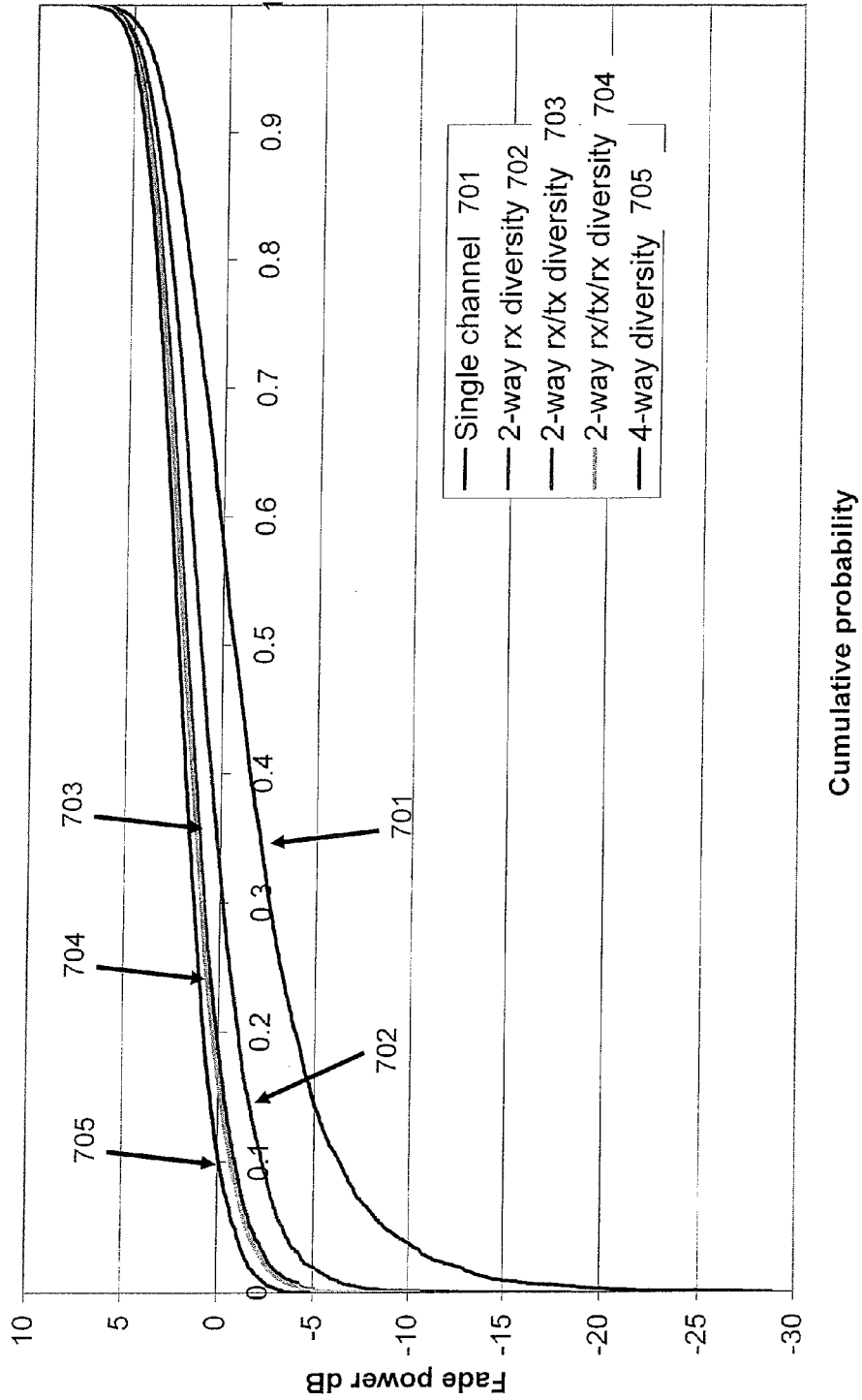
FIG. 7 is a graph showing the cumulative probability distribution of signal power due to fading, indicating the potential benefit available from the 4-way diversity technique, in comparison to current 2-way diversity methods.

FIG. 7 shows simulation results, indicating the relative gains of this algorithm. FIG. 7 shows a cumulative probability distribution for fading conditions, based on a Ricean model K=4 dB model (i.e. there is a dominant non-fading component that is 4 dB greater in power than the fading paths). This represents a typical case for a line-of-sight urban deployment. In this case, the first iteration of the 2-way receive diversity provides a substantial gain (line 702 compared to line 701), in terms of a reduced margin that needs to be allowed for fades (e.g., there is a 10% probability that there will be a fade for a single channel of 6.3 dB or more, but at 10% probability, the fade margin for 2-way diversity is reduced to 2.3 dB). Further iterations of the 2-way diversity algorithm further reduce the fade margin (lines 703 and 704), approaching the best possible case of the 4-way diversity (line 705). This graph is shown for the case with complete polarisation mixing, i.e. the cross-polar ratio is 0 dB. The four diversity paths are therefore of equal power.

However, if there is a dominant line-of-sight component (as with the K=4 dB Ricean fading) and little path loss in excess of free space propagation, the cross-polar conversion is likely to be much lower. In this case, paths between V polarisation at the transmitting node and V polarisation at the receiving node will be much stronger than paths from V polarisation to H polarisation. In the absence of polarisation conversion, there are only two effective propagation paths, not four.

Figure 8:
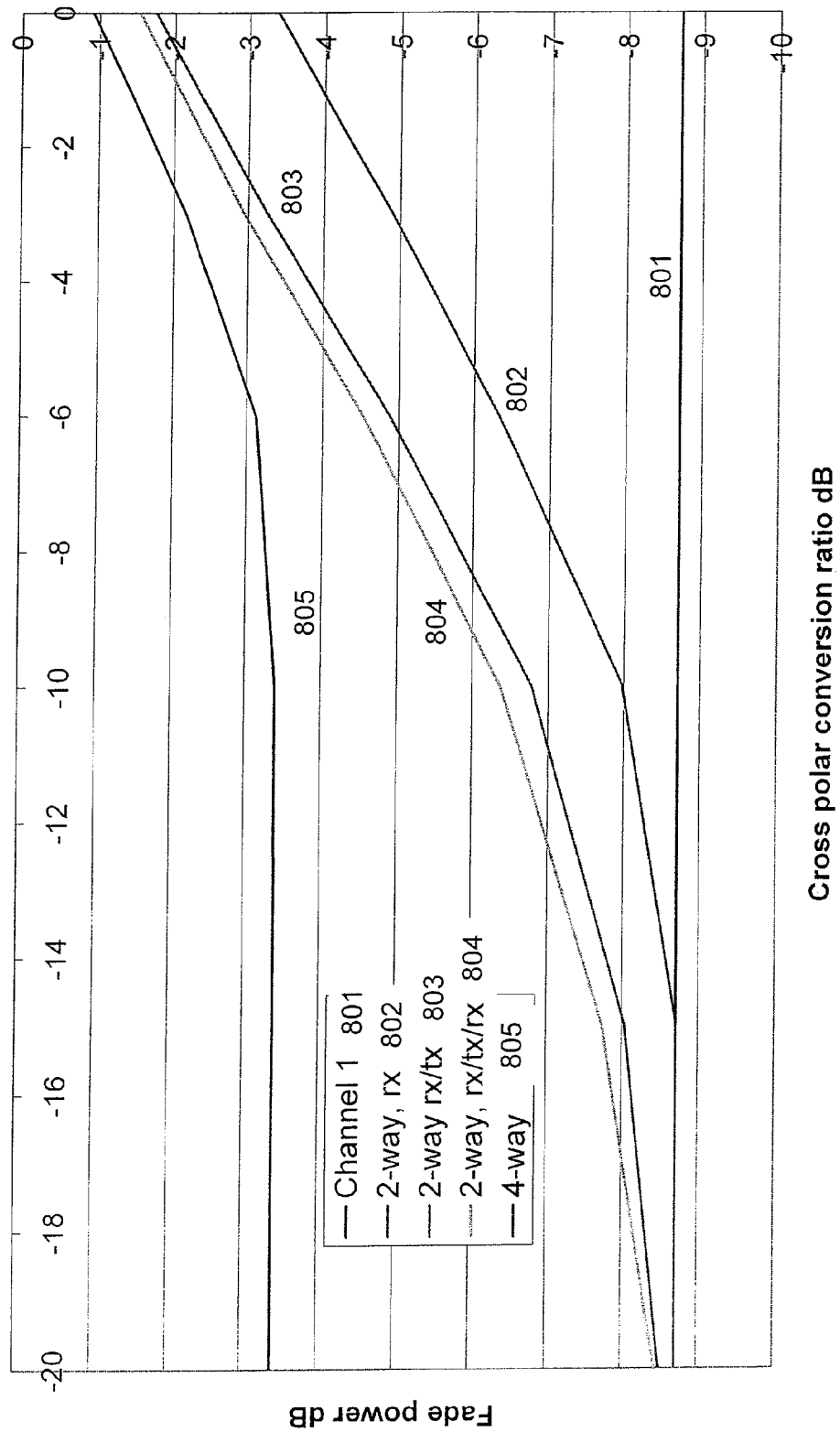
FIG. 8 is a graph showing the fade margin that would be allowed for 95% availability of a radio link, for given cross-polar conversion ratios.

In FIG. 8, the fade margin for 95% availability (5% outage) is shown for varying cross-polar conversion ratio. Here, cross-polar conversion ratio is expressed as a negative value, i.e. the ratio of the signal arrival on the orthogonal polarisation to the co-polar signal arrival. If there is complete polarisation mixing (0 dB conversion ratio) as in FIG. 3, then the 4-way diversity algorithm (line 805) has only about 0.6 dB improvement over the best result for three iterations of 2-way diversity (line 804). However, as the polarisation conversion is reduced, the required fade margin for all of the 2-way diversity algorithms (lines 802-804) increases towards that for a single channel (line 801). The fade margin for 4-way diversity also increases. In the absence of polarisation conversion, the fade margin for 4-way diversity is the same as that for 2-way diversity with complete polarisation conversion. In effect, the 4-way diversity technique restores the benefits of 2-way diversity that would otherwise be lost in the absence of polarisation conversion.

Figure 9:
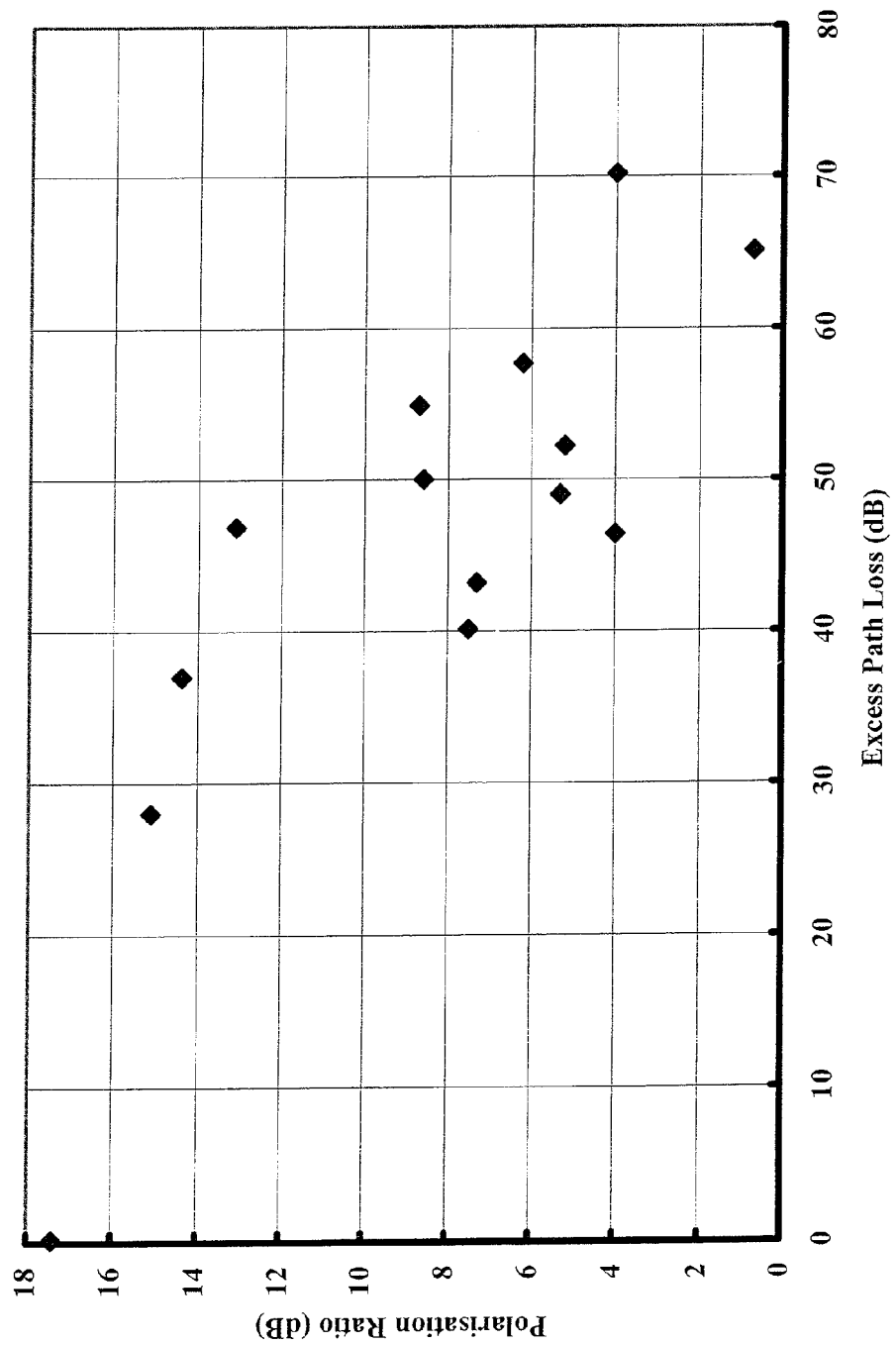
FIG. 9 is a graph showing trials results indicating the variation of cross-polar conversion ratio with excess path loss above free space propagation.

The degree of polarisation conversion to be expected in an urban street canyon environment is not clear. Results from trials at a lower frequency but in an environment similar to a street canyon suggested that the polarisation conversion ratio is above −10 dB for cases where the path is more than 40 dB in excess of free space path loss. These results are shown here in FIG. 9 (in which polarisation conversion ratios values are shown as inverted values, i.e. co-polar received signal/orthogonal polarisation received signal). This trend has been observed elsewhere, suggesting that polarisation conversion would be low (i.e. large negative ratio) for street canyon environments.

Estimating that the cross-polar ratio would be −10 dB, then the 4-way diversity technique would provide a 3 dB reduction in fade margin for 95% availability. Based on free space path loss, this corresponds to an increase in range by a factor of 1.4, or a halving of the number of nodes required to relay data over a given area.

According to a further aspect, there is a provided a protocol that allows a radio link with M transmitter antennas and N receiver antennas to achieve M×N-way diversity gain.

The protocol extends the definition and function of the 802.11 RTS frames, such that these frames also carry data to identify the antenna used for transmission.

The protocol may also extend the definition of the 802.11 CTS frames, such that these frames also carry data to request an antenna to be used for transmission.

The protocol may be one in which designated test data is transmitted in sequence from a plurality of antennas, such that the receiver can assess propagation paths from each antenna.

According to the protocol, the nodes in a network determine whether to test multiple transmitting node to receiver propagation paths, based on the anticipated gain and signalling overhead.

Advantageously, this allows the margin allowed for signal fading to be reduced, thereby increasing the achievable range of the radio link. This allows a significant reduction on the overall number of links required, and hence reduces the system cost.

The examples provided herein refer to 802.11 technology. This invention is however not limited to this type of wireless technology or to wireless local area networks. The invention is applicable to any wireless technology or network architecture which utilises antenna diversity, including $3^{rd}$ Generation Mobile technology.

It will be understood that the above description of a preferred embodiment is given by way of example only and that various modifications may be made by those skilled in the art without departing from the spirit and scope of the invention.

The invention claimed is:

1. A method of communicating between a first transceiver and a second transceiver, the first transceiver having a first plurality of antennas and the second transceiver having a second plurality of antennas, said method comprising:
    transmitting signals from said first transceiver to said second transceiver using the first plurality of antennas of said first transceiver and the second plurality of antennas of said second transceiver, wherein each of the signals is transmitted from a respective one of the first plurality of antennas and during a respective time interval, wherein both the first plurality of antennas and the second plurality of antennas are configured to provide polarization diversity;
    at the second transceiver, selecting one of said first plurality of antennas and one of said second plurality of antennas for use as an optimum antenna pair; and
    communicating between the two transceivers using said optimum antenna pair.

2. The method of claim 1, further comprising:
    receiving the signals at the second transceiver, wherein said selecting comprises selecting the one of said first plurality of antennas and one of said second plurality of antennas based on at least one property of the signals.

3. The method of claim 1, wherein each of the signals includes an indicator of the respective antenna used to transmit the signal at the first transceiver.

4. The method of claim 1, further comprising:
    transmitting from the second transceiver to the first transceiver a selection signal indicating the selected at least one of said first plurality of antennas.

5. The method of claim 1, wherein each of said signals is a request-to-send (RTS) frame conforming to a 802.11 wireless communication standard.

6. The method of claim 1, wherein said selecting the optimum antenna pair is based on measurements of signal strength of each of the signals as received by the second transceiver at each of the second plurality of antennas.

7. The method of claim 1, further comprising:
    transmitting an acknowledgement from the second transceiver to the first transceiver for each of the signals that is successfully received by the second transceiver.

8. The method of claim 7, wherein the acknowledgment for each signal is a clear-to-send frame conforming to a 802.11 wireless communication standard.

9. The method of claim 1, wherein the second transceiver is an access point of a wireless network.

10. The method of claim 1, wherein each antenna of the first plurality is an array of antennas.

11. The method of claim 1, wherein the first transceiver and the second transceiver are wireless access and routing points (WARPs) of a mesh network.

12. A system, comprising:
- a first transceiver having a first plurality of antennas configured to provide polarization diversity, the first transceiver being configured to transmit signals using the first plurality of antennas, wherein the first transceiver is configured to transmit each of the signals from a respective one of the first plurality of antennas and during a respective time interval; and
- a second transceiver having a second plurality of antennas configured to receive the signals and to select one of said first plurality of antennas of the first transceiver and one of said second plurality of antennas for use an optimum antenna pair, wherein the first transceiver is further configured to communicate with the second transceiver using said optimum antenna pair.

13. The system of claim 12, wherein the second transceiver is further configured to select the one of said first plurality of antennas and one of said second plurality of antennas based on at least one property of the signals.

14. The system of claim 12, wherein each of the signals includes an indicator of the respective antenna used to transmit the signal.

15. The system of claim 12, wherein the second transceiver is further configured to transmit to the first transceiver a selection signal indicating the selected at least one of said first plurality of antennas.

16. A method of communicating between a first transceiver and a second transceiver, wherein said first transceiver has a first plurality of antennas and the second transceiver has a second plurality of antennas, said method comprising:
- transmitting signals from said first transceiver to said second transceiver using the first plurality of antennas of said first transceiver and the second plurality of antennas of said second transceiver, wherein each of the signals is transmitted from a respective one of the first plurality of antennas and during a respective time interval, wherein both the first plurality of antennas and the second plurality of antennas are configured to provide polarization diversity;
- receiving a selection signal from said second transceiver indicating a selection of an optimum antenna pair one of said first plurality of antennas of said first transceiver and one of said second plurality of antennas of said second transceiver; and
- communicating with said second transceiver using said optimum antenna pair as indicated by the selection signal.

17. The method of claim 16, wherein each of the signals includes an indicator of the respective antenna used to transmit the signal.

18. A transceiver, comprising:
- a first plurality of antennas configured to provide polarization diversity at the transceiver;
- a signal generator configured to generate signals for transmission using the first plurality of antennas;
- a transmitter configured to transmit each of the signals from a respective one of the first plurality of antennas and during a respective time interval; and
- a receiver configured to receive a selection signal indicating a selection of an optimum antenna pair of one antenna of the first plurality of antennas and further antenna of a second plurality of antennas of further transceiver configured to provide polarization diversity at the further transceiver, wherein the signal generator is further configured to communicate using the optimum antenna pair as indicated by the selection signal.

19. The transceiver of claim 18, wherein the signal generator is configured to include in each of the signals an indicator of the respective antenna used to transmit the signal.

20. A method of operating a first transceiver in order to facilitate communication between the first transceiver and a second transceiver, wherein the first transceiver has a first plurality of antennas and the second transceiver has a second plurality of antennas, said method comprising:
- receiving signals from said second transceiver, wherein each of the signals is transmitted by the second transceiver using a respective one of said second plurality of antennas and during a respective time interval, wherein both the first plurality of antennas and the second plurality of antennas are configured to provide polarization diversity;
- selecting one of said first plurality of antennas and one of said second plurality of antennas for use as an optimum antenna pair; and
- transmitting an indication of the selected optimum antenna pair to said second transceiver.

21. The method of claim 20, wherein each of the signals includes an indicator of the respective antenna used to transmit the signal.

22. A transceiver, comprising:
- a receiver having a first plurality of antennas configured to provide polarization diversity receiving signals transmitted from a further transceiver having a second plurality of antennas configured to provide polarization diversity, wherein each of the signals is transmitted by the further transceiver using a respective one of said second plurality of antennas and during a respective time interval;
- an antenna selector configured to select one of said first plurality of antennas of the receiver and one of said second plurality of antennas of the further transceiver for use as an optimum antenna pair; and
- a transmitter configured to communicate an indication if said selected optimum antenna pair to the other transceiver.

23. The transceiver of claim 22, wherein the antenna selector is further configured to select the one of said first plurality of antennas and one of said second plurality of antennas based on at least one property of the received signals.

24. The transceiver of claim 22, wherein each of the signals includes an indicator of the respective antenna used to transmit the signal.

* * * * *